(12) United States Patent
Sellers et al.

(10) Patent No.: US 8,651,142 B2
(45) Date of Patent: Feb. 18, 2014

(54) FLOW MODULATING DEVICE

(75) Inventors: Benjamin J. Sellers, Bath (GB); Paul R. Tulip, Bristol (GB); Alastair P. Roberts, Bristol (GB); Richard P. Bacon, Bristol (GB)

(73) Assignee: Rolls-Royce PLC, London (GB)

( * ) Notice: Subject to any disclaimer, the term of this patent is extended or adjusted under 35 U.S.C. 154(b) by 951 days.

(21) Appl. No.: 12/760,904

(22) Filed: Apr. 15, 2010

(65) Prior Publication Data
US 2010/0276025 A1 Nov. 4, 2010

(30) Foreign Application Priority Data

May 1, 2009 (GB) .................................. 0907513.6
May 19, 2009 (GB) .................................. 0908556.4

(51) Int. Cl.
*G05D 7/01* (2006.01)
*F02K 1/00* (2006.01)
*F16K 17/38* (2006.01)

(52) U.S. Cl.
USPC .................. 138/45; 138/46; 60/770; 137/468

(58) Field of Classification Search
USPC .................. 60/770, 204, 262, 264, 226.1; 138/37–46; 137/15.1, 15.2, 468
See application file for complete search history.

(56) References Cited

U.S. PATENT DOCUMENTS

| | | | | |
|---|---|---|---|---|
| 3,566,964 A | * | 3/1971 | Livingston | 166/326 |
| 4,355,664 A | * | 10/1982 | Cook et al. | 138/110 |
| 4,398,868 A | * | 8/1983 | Komauer et al. | 417/64 |
| 4,480,784 A | * | 11/1984 | Bennett | 236/93 B |
| 5,484,105 A | * | 1/1996 | Ausdenmoore et al. | 239/127.3 |
| 5,967,187 A | * | 10/1999 | Horne et al. | 137/875 |
| 6,318,070 B1 | * | 11/2001 | Rey et al. | 60/226.3 |
| 6,718,752 B2 | * | 4/2004 | Nesbitt et al. | 60/204 |
| 6,735,936 B2 | * | 5/2004 | Rey et al. | 60/226.3 |
| 6,779,963 B2 | * | 8/2004 | Kang | 415/1 |
| 6,813,877 B2 | * | 11/2004 | Birch et al. | 60/226.1 |
| 7,000,378 B2 | * | 2/2006 | Birch et al. | 60/226.1 |
| 7,093,423 B2 | * | 8/2006 | Gowda et al. | 60/204 |

(Continued)

FOREIGN PATENT DOCUMENTS

| | | |
|---|---|---|
| EP | 1 367 249 A1 | 12/2003 |
| EP | 1 544 524 A1 | 6/2005 |

(Continued)

OTHER PUBLICATIONS

Sep. 18, 2009 Search Report issued in British Patent Application No. GB0908556.4.

*Primary Examiner* — Paul R Durand
*Assistant Examiner* — Matthew Lembo
(74) *Attorney, Agent, or Firm* — Oliff PLC

(57) ABSTRACT

A flow modulating device comprises flow modulating elements 8 of a shape memory alloy, which are acted upon by resilient elements 10. The flow modulating elements 8 and resilient elements 10 are mounted on a common support ring 6. At one temperature, the flow modulating elements 8 overcome the resilient force of the resilient elements 10 to lie against the wall of a duct 4 in which the device is situated. The flow modulating elements 8 thus offer a relatively low resistance to flow in the duct 4. At a second temperature, the force of the resilient elements 10 overcomes that of the flow modulating elements 8 to deflect them inwardly of the duct 4, so increasing the flow resistance of the device.

15 Claims, 4 Drawing Sheets

(56) References Cited

U.S. PATENT DOCUMENTS

| | | | |
|---|---|---|---|
| 7,216,831 B2* | 5/2007 | Wood | 244/99.8 |
| 7,340,883 B2* | 3/2008 | Wood et al. | 60/226.1 |
| 7,367,776 B2* | 5/2008 | Albers et al. | 415/173.1 |
| 7,458,221 B1 | 12/2008 | Arnold et al. | |
| 7,503,392 B2* | 3/2009 | King et al. | 166/373 |
| 7,546,727 B2* | 6/2009 | White | 60/204 |
| 7,578,132 B2* | 8/2009 | Webster | 60/770 |
| 7,607,634 B2* | 10/2009 | Browne et al. | 251/4 |
| 7,644,575 B2* | 1/2010 | Wood et al. | 60/204 |
| 7,735,601 B1* | 6/2010 | Stieger et al. | 181/213 |
| 7,762,078 B2* | 7/2010 | Lynch et al. | 60/771 |
| 8,157,207 B2* | 4/2012 | Mengle et al. | 244/53 R |
| 8,186,143 B2* | 5/2012 | Wood et al. | 60/204 |
| 8,291,710 B2* | 10/2012 | Webster | 60/771 |
| 8,397,485 B2* | 3/2013 | Wood et al. | 60/204 |
| 2003/0024567 A1* | 2/2003 | Spriegel et al. | 137/62 |

FOREIGN PATENT DOCUMENTS

| | | |
|---|---|---|
| GB | 2 374 121 A | 10/2002 |
| WO | WO 2008/033699 A2 | 3/2008 |
| WO | WO 2008/047357 A2 | 4/2008 |

* cited by examiner

FLOW MODULATING DEVICE

This invention relates to a flow modulating device for modulating the flow in a duct.

It is common in flow systems to modulate fluid flow in a duct in dependence on various parameters, for example the temperature of the flowing fluid. Such flow modulation is particularly, although not exclusively, required in gas turbine engines, for example to modulate the flow of cooling air in dependence on the temperature of that cooling air. Such modulation can improve the efficiency of the system when operating under varying conditions, and particularly when working at off design conditions. It is known for such flow modulation to be achieved by means of valves and similar devices which are actuated manually, or by way of actuators such as hydraulic or electromagnetic actuators. Manual actuation can be unreliable, while actuators add cost, complexity and weight to the system, and introduce components which may fail.

Materials, such as shape memory alloys (SMAS), are known which exhibit a shape memory effect. Such materials exhibit the property of returning to a predetermined shape when their temperature changes through a transition temperature. Typically, a component made from an SMA resumes the predetermined, or "memorised", shape when heated above a transition temperature. Even if the component is deformed in the "cold" state while it is below the transition temperature, it returns to the memorised shape when heated above the transition temperature. In practice, the transformation takes place over a relatively small temperature range rather than at a precise temperature, but for the purposes of this specification this range will referred to as the "transition temperature".

The shape memory effect is achieved by various mechanisms, many of which are well known. In the case of metallic shape memory materials such as Nitinol, the effect is commonly achieved as a result of the transformation of the crystal structure of the alloy between austenitic and martensitic phases accompanied by twinning and de-twinning at crystal boundaries in the material.

The material has a higher modulus (i.e. is stiffer) in the austenitic phase than in the martensitic phase. Consequently, while in the martensitic phase, the material can be elastically deformed relatively easily. If the deformed material is heated above the transition temperature, it reverts to the austenitic phase and the higher modulus causes it to overcome the deforming force and revert to its memorised shape. Thus, many SMAs can be regarded as having "one way" shape memory properties, in that they will assume a memorised shape at one temperature, but require the application of a force, for example from a spring, to convert them to a different shape at another temperature.

However, some materials are known which have "two way" shape memory properties, and will switch between two different memorised shapes as a result of temperature changes without requiring the application of an external force.

According to a first aspect of the present invention there is provided a flow modulating device for modulating flow in a duct, the device comprising a first flow modulating element having a fixed end secured to a wall of the duct and a free end which is displaceable relative to the wall of the duct, and a first actuation element which acts on the free end of the first flow modulating element, one of the first flow modulation element and first actuation element are made from a material exhibiting a shape memory effect and the other is a resilient element; wherein the first flow modulating element and first actuation element assume a first configuration at a first temperature above a transition temperature and assume a second configuration at a second temperature below the transition temperature, and wherein the modulus of the material exhibiting a shape memory effect will change at the transition temperature such that it overcomes the resilience of the resilient element at the first temperature to assume the first configuration; and the resilient element will overcome the resilience of the material exhibiting a shape memory effect at the second temperature to cause the first flow modulating element to assume the second configuration, the first flow modulating element offering a greater resistance to flow in the duct in one of the configurations than in the other.

Preferably the device further comprises a second flow modulating element having a fixed end secured to a wall of the duct and a free end which is displaceable relative to the wall of the duct, and a second actuation element which acts on the free end of the second flow modulating element, one of the second flow modulation element and second actuation element are made from a material exhibiting a shape memory effect and the other is made from a resilient material to thereby provide a resilient element; whereby the second flow modulating element and second actuation element assume the first configuration and second configuration at different temperatures to that of the first flow modulating element and first actuation element.

The first temperature may be higher than the second temperature, in which case the flow modulating element may offer a lower resistance to flow in the first configuration than in the second configuration. Alternatively, the flow modulating element may offer a higher resistance to flow in the first configuration (at the higher temperature) than in the second configuration (at the lower temperature). In the configuration offering the lower resistance to flow, the flow modulating element may be disposed adjacent a wall of the duct, while in the second configuration, the flow modulating element may extend inwardly from the wall.

The flow modulating element may be elongate, and may have a fixed end secured to the wall of the duct, and a free end which is displaceable relative to the wall of the duct. In the configuration in which the flow modulating element lies adjacent to the wall of the duct, the flow modulating element may be substantially parallel to the wall. In the other configuration, the free end of the flow modulating element may be deflected inwardly of the duct with respect to the fixed end.

The first and second flow modulating elements are two of a plurality of first and second flow modulating elements disposed in a circumferential array around the wall of the duct.

The actuation element may be one of a plurality of actuation elements disposed in a circumferential array around the wall of the duct. The actuation element may be elongate, having fixed ends adjacent the fixed ends of respective ones of the flow modulating elements, and free ends engaging the respective flow modulating elements adjacent to their free ends. The fixed ends of the actuation element may be disposed radially outwardly of the fixed ends of the flow modulating elements, with respect to the central axis of the duct. The actuation elements and the flow modulating elements may be mounted on a common support ring secured within the duct.

In an alternative embodiment, the or each actuation element may have a fixed end which is secured to the duct wall at a position spaced from the flow modulating element in a direction away from the fixed end of the flow modulating element.

The actuation element and the flow modulating elements may alternate with one another around the central axis of the duct, whereby each actuation element engages two adjacent flow modulating elements.

The or each actuation element may comprise a spring element which acts between the duct wall and the free end of the flow modulating element, or of one of the flow modulating elements.

The circumferential width of each flow modulating element may decrease in the direction away from its fixed end.

There may also be provided a flow modulating device for modulating the flow in a duct, the device comprising a flow modulating element having a fixed end secured to a wall of the duct and a free end which is displaceable relative to the wall of the duct and made from a material exhibiting a shape memory effect whereby the flow modulating element assumes a first configuration at a first temperature above a transition temperature and assumes a second configuration at a second temperature below the transition temperature, the flow modulating element offering a greater resistance to flow in the duct in one of the configurations than in the other; at least one resilient element which acts on the flow modulating element, wherein the modulus of the material of the flow modulating element will change at the transition temperature such that the flow modulating element overcomes the resilience of the resilient element at the first temperature to assume the first configuration; and the resilient element will overcome the resilience of the flow modulating element at the second temperature to cause the flow modulating element to assume the second configuration; the or each resilient element comprising a spring element which acts between the duct wall and the free end of the flow modulating element, or of a respective one of the flow modulating elements.

For a better understanding of the present invention, and to show more clearly how it may be carried into effect, reference will now be made, by way of example, to the accompanying drawings, in which.

Figure 3:
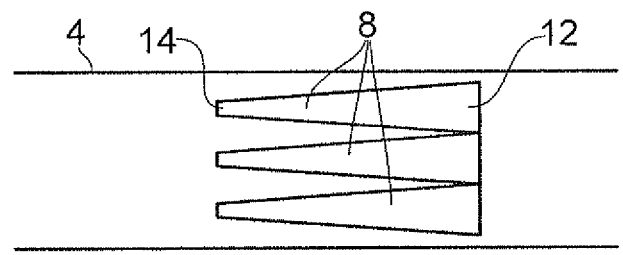
FIG. 3 is a schematic sectional view of a variant of the flow modulating device of FIGS. 1 and 2 in a non-restricting configuration.
Figure 4:
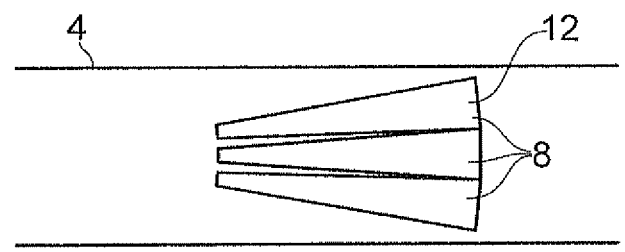
Figure 5:
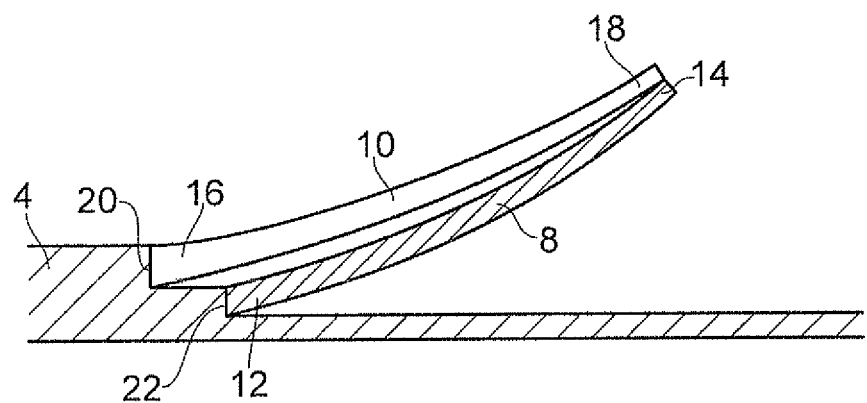
Figure 6:
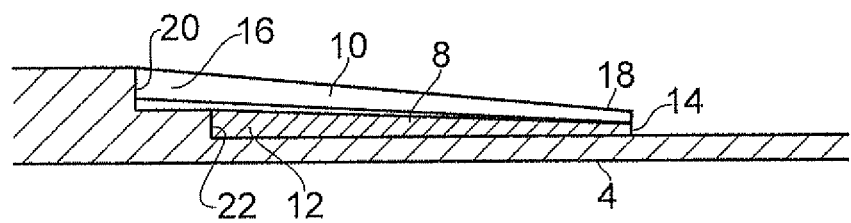
Figure 7:
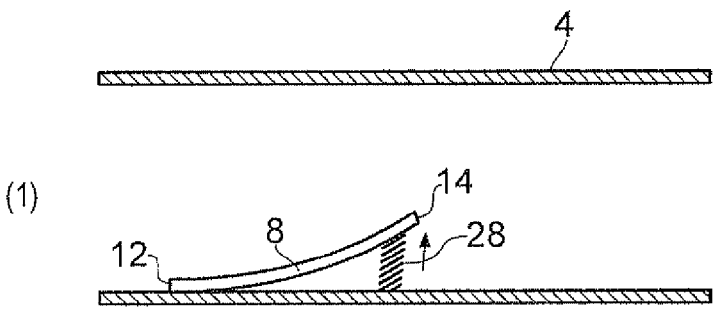
Figure 8:
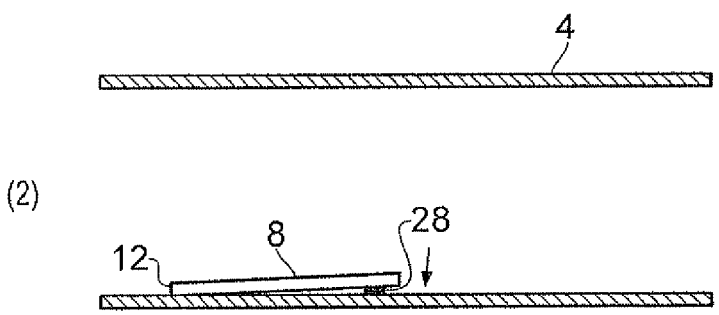
Figure 9:
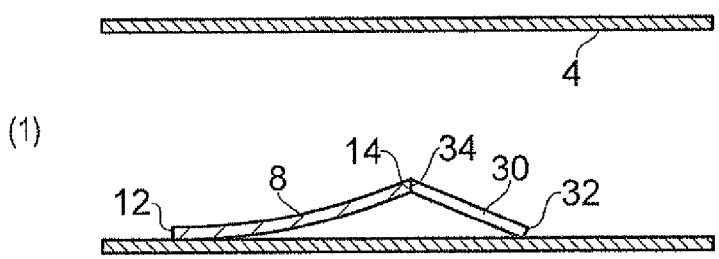
Figure 10:
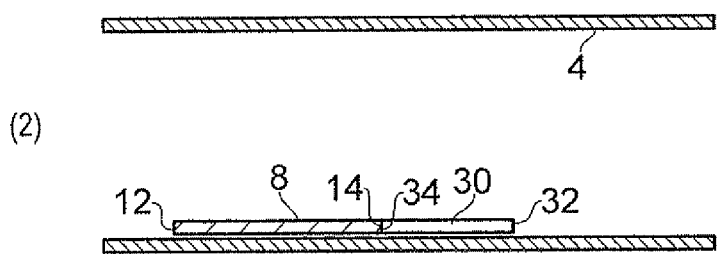

FIG. 4 corresponds to FIG. 3 but shows the device in a flow restricting configuration;

FIG. 5 is an enlarged view of a single flow modulating element and actuation element of the device of FIGS. 3 and 4, in a flow restricting configuration;

FIG. 6 corresponds to FIG. 5 but shows the flow modulating element and the actuation element in a non-restricting configuration;

FIG. 7 shows a further embodiment of a flow modulating device in a flow restricting configuration;

FIG. 8 corresponds to FIG. 7 but shows the device in a non-restricting configuration;

FIG. 9 shows a further embodiment of a flow modulating device in a flow restricting configuration;

FIG. 10 shows the device of FIG. 9 in a non-restricting configuration; and

Figure 11:
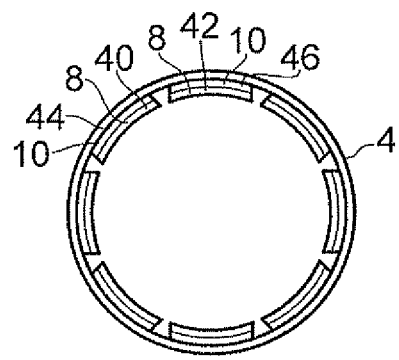
Figure 12:
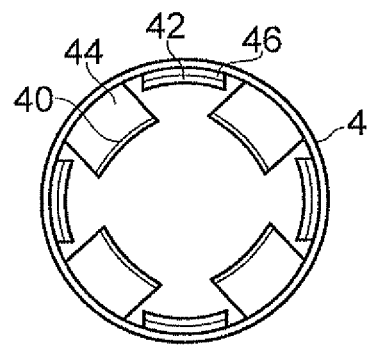
Figure 13:
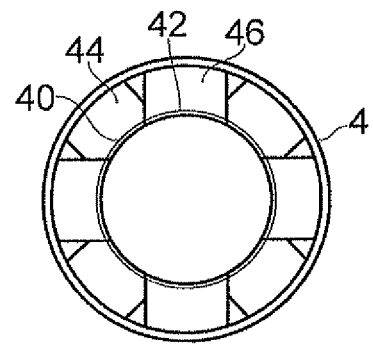

FIGS. 11, 12 and 13 show another embodiment of the present invention in a variety of flow restricting conditions.

Figure 1:
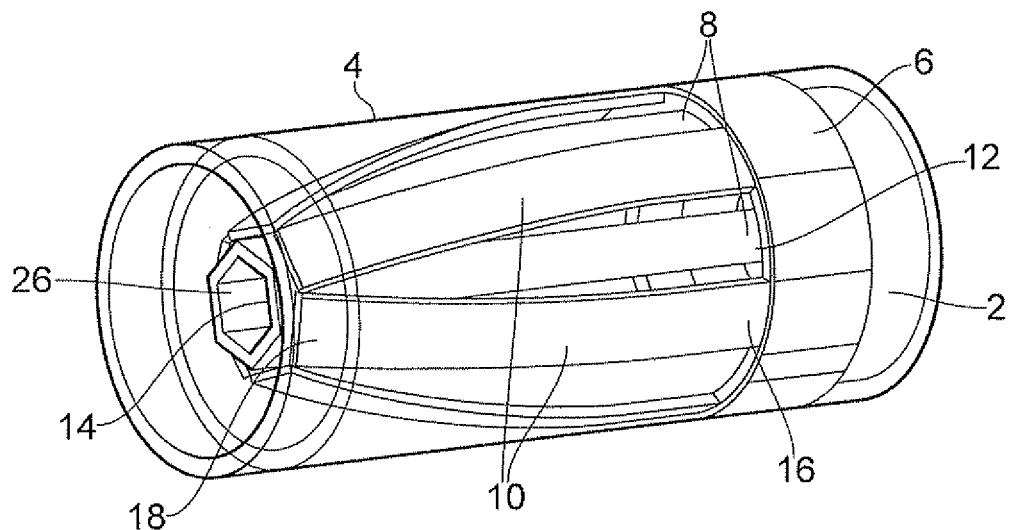
FIG. 1 is a perspective view of a flow modulating device in a flow restricting configuration.
Figure 2:
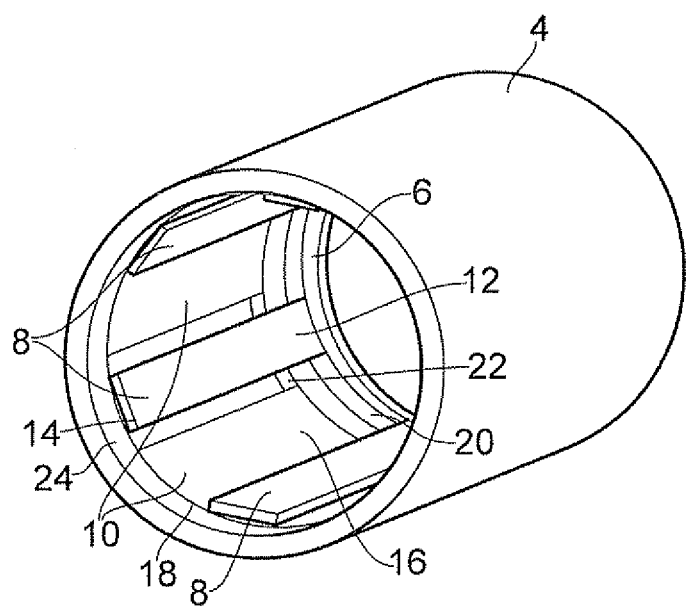
FIG. 2 shows the flow modulating device of FIG. 1 in a non-restricting configuration.

The flow modulating device 2 of FIGS. 1 and 2 is shown in a duct in a form of a cylindrical pipe 4. The device 2 comprises a common support ring 6 which is secured to the wall of the pipe 4 and is provided with circumferential arrays of flow modulating elements 8 and actuation elements 10 which alternate with one another around the support ring 6. Thus one of the actuation elements 10 is disposed between each adjacent pair of flow modulating elements 8.

Each flow modulating element 8 is elongate, having the general form of a rectangular blade. Each flow modulating element 8 has a fixed end 12 secured to the support ring 6, and a free end 14 spaced along the pipe 4 from the support ring 6. Similarly, each actuation element 10 is elongate in the form of a rectangular blade, and has a fixed end 16 secured to the support ring 6, and a free end 18 spaced from the support ring 6 along the pipe 4. The fixed ends 12 of the flow modulating elements 8 lie on a slightly smaller radius of the support ring 6 than the actuation elements 10 as can be appreciated from FIG. 2. The support ring 6 has respective axially directed shoulders 20, 22 which are axially spaced apart from each other and disposed one within the other, from which the flow modulating elements 8 and the actuation elements 10 extend. As can also be seen in FIG. 2, the pipe 4 has a shoulder 24 adjacent the free ends 14, 18 of the flow modulating elements 8 and the actuation elements 10. In the configuration shown in FIG. 2, the actuation elements 10 nest against the shoulder 24, while the flow modulating elements 8 are situated radially inwards of the shoulder 24. This feature improves the smoothness of the wall of the pipe 4 in the configuration shown in FIG. 2.

Either the flow modulating element 8 or the actuation element 10 is made from a material which undergoes a phase change at a transition temperature. For example, each flow modulating element 8 may be made from a Shape Memory Alloy (SMA) such as Nitinol, for which the transition temperature may fall in a range extending from below 0° C. to above 100° C. In the "cold" phase, i.e. below the transition temperature, Nitinol has a martensitic structure, whereas in the "hot" phase above the transition temperature it transforms to an austenitic structure. A desired memorised shape of each flow modulating element 8 or actuation element 10 is fixed by heating the element, while held in the desired shape, to an elevated temperature (for example about 500° C.). Subsequently, if the SMA is reduced in temperature to below its transition temperature, it transforms to the martensitic structure, in which form it has a relatively low modulus and can be deformed from the memorised shape with a moderate force. If the SMA is then reheated to above the transition temperature, it reverts to the austenitic structure in which it has an increased modulus causing the flow modulating element 8 or actuation element 10 to attempt to resume its memorised shape with significant force.

Whichever of the flow modulation element 8 or the actuation element 10 is not made of material exhibiting a shape memory effect is made of a resilient material, for example a spring element made of spring steel, to provide a resilient element.

In the embodiment shown in FIGS. 1 and 2 the memorised shape of each of the flow modulating elements 8 is that shown in FIG. 2, in which each flow modulating element 8 is generally straight, and lies parallel to the wall of the pipe 4. The actuation elements 10 are biased to deflect inwardly from the fixed end 16 to the free end 18, as shown in FIG. 1.

The modulus of the resilient element is greater than the SMA in the "cold" (i.e. martensitic) phase, but less than the modulus of the material exhibiting a shape memory effect in the "hot" (i.e. austenitic) phase.

Consequently, in the "hot" phase as shown in FIG. 2, the element exhibiting a shape memory effect (which may be the flow modulation element 8 or the actuation element 10) overcomes the resilient bias imposed by the resilient element (which is whichever of the flow modulation element 8 or the actuation element 10 which is not made of material exhibiting a shape memory effect) and thus returns to their memorised shape, constituting a first configuration, in which they, and the actuation element, are generally parallel to the pipe 4 and consequently do not offer any substantial resistance to flow along the pipe 4.

In the "cold" phase shown in FIG. 1 the resilient bias of the resilient elements is sufficient to deflect the SMA elements inwardly of the wall of the pipe 4, i.e. to assume a second configuration, in which the flow modulating elements offer a significant resistance to flow in the pipe 4. As will be appreciated, the flow cross-section of the pipe 4 effectively becomes that of the opening 26 defined by the abutting free ends 14 of the flow modulating elements 8. In the embodiment shown in FIGS. 1 and 2, there are six of the flow modulating elements, so that the opening 26 is hexagonal. It will be appreciated that other numbers of flow modulating elements can be used.

The actuation elements 10 alternate with the flow modulating elements 8 around the pipe 4. Consequently, each actuation element 10 contacts two adjacent flow modulating elements 8, and bridges the gap between them so as to enhance the flow restriction in the condition shown in FIG. 1.

It will be appreciated that, in FIG. 2, the flow modulating elements 8 and the actuation elements 10 are shown separated from one another for clarity. However, in a practical embodiment, the actuation elements 10 will be biased inwardly into contact with the free ends 14 of the flow modulating elements 8.

The flow modulating device as shown in FIGS. 1 and 2 consequently offers a relatively large flow cross-section in the pipe 4 when the flowing fluid is hot, yet offers a smaller flow cross-section when the flowing fluid is cold. The device will adjust automatically in dependence on the temperature of the flowing fluid. Although the device may have many different applications, one possible application is to modulate the flow of cooling air in a gas turbine engine. Thus, when the temperature of the cooling air is relatively low, for example as a result of the temperature of the ambient surroundings, or as a result of the operating condition of the engine, the flow of the cooling air is restricted. Since cooling air extracted from a compressor stage of the engine represents a loss of air for propulsion, a reduction in the flow range of the cooling air represents increased efficiency of the engine. However, when the temperature of the cooling air increases, the action of the flow modulating elements 8 increases the effective flow cross-section of the pipe 4, resulting in an increased flow of cooling air to those components of the engine requiring cooling.

As mentioned above, the flow modulating elements 8 of the device shown in FIGS. 1 and 2 have a generally rectangular form. This imposes a limit on the minimum size of the opening 26 when the flow modulating elements 8 come into contact with one another, and also results in gaps between adjacent flow modulating elements 8 towards their fixed ends 12 which, for enhanced flow restriction, need to be closed at least partially by the overlying actuation elements 10. In the embodiment of FIGS. 3 and 4 the flow modulating elements 8 have a generally triangular form, tapering from their fixed ends 12 to their free ends 14. This shape enables the free ends 14 of the flow modulating elements 8 to contact one another at a smaller diameter so providing a smaller opening 26 and minimises the gap between adjacent flow modulating elements 8. For clarity, actuation elements are not shown in FIG. 3 and FIG. 4.

Consequently, there is no need for the actuation elements 10 to overlap adjacent flow modulating elements 8 to block the gaps. Instead, for example, the actuation elements 10 can be the same shape as the flow modulating elements and overlie them. This is shown in FIGS. 5 and 6. In this embodiment, the actuation elements 10 lie radially inwardly of the respective flow modulating elements 8 and are fixed to the flow modulating elements 8 at the respective free ends 14, 18, i.e. the ends away from the fixed ends 12, 16 which engage the wall of the pipe 4. Thus, the fixed end 12 of the flow modulating element 8 is secured to the wall of the pipe 4 at the radially outer shoulder 22, while the fixed end 16 of the actuation element 10 engages the radially inner shoulder 20.

In the cold condition as shown in FIG. 5, the actuation element 10 overcomes the force applied by the flow modulating element 8, and so is able to elongate the flow modulating element in its low modulus condition. At high temperature, as shown in FIG. 6, the higher modulus flow modulating element 8 contracts, drawing itself and the actuation element 10 towards the wall of the pipe 4 to reduce the flow resistance. The embodiment of FIGS. 5 and 6 can thus provide a flow modulating device having a greater turndown, i.e. a greater difference between the maximum and minimum flow conditions.

In the embodiments of FIGS. 1 to 6, the resilient effect biasing the flow modulating elements 8 is applied by the actuation elements 10 which are in the form of blades or strips, extending generally parallel to the flow modulating elements 8 from fixed ends 12, 16 secured to a common support ring 6. Other forms of actuation element are possible, for example as shown in FIGS. 7 to 10.

In the embodiment of FIGS. 7 and 8, each flow modulating element 8 is biased inwardly of the pipe 4 at its free end 14 by a helical actuation element 28. In embodiments where the actuation element is made from a resilient material, the helical actuation element is provided as a conventional spring element 28, for example a helical spring. FIG. 8 shows the device in the "hot" condition, in which the flow modulating element 8 overcomes the force of the helical actuation element 28 and so assumes the first configuration, in which it lies in a parallel to the wall of the pipe 4. FIG. 7 shows the "cold" condition, in which the flow modulating element 8 assumes its second configuration, under the action of the helical actuation element 28, to increase the resistance to flow in the pipe 4.

FIGS. 9 and 10 show an embodiment in which the actuation element is in the form of a flexible arm 30. In this embodiment, the arm has a fixed end 32 secured to the wall of the pipe 4 and a free end 34 which engages the free end 14 of the flow modulating element 8. As in the previous embodiments, the flow modulating element 8 has a fixed end 12 which is secured to the wall of the pipe 4. In the embodiment of FIG. 9 the fixed end 32 of the arm 30 is spaced from the free end 14 of the flow modulating element 8, in a direction along the pipe 4 away from the fixed end 12 of the flow modulating element 8. In the "cold" configuration shown in FIG. 8, the flow modulating element 8 and the actuation element 10 assume an arched shape, bowed away from the wall of the pipe 4. In the "hot" condition, the increased modulus of the flow modulating element enables it to overcome the action of the actuation element 10 so as to contract, drawing both the flow modulating element 8 and the actuation element 10 against the wall of the pipe 4. Thus, as can be seen from FIG. 9, the flow modulating element acts in tension, rather than in bending as in the embodiments of FIGS. 1 to 7.

It will be appreciated that FIGS. 7 to 10 show only a single one of the flow modulating elements 8 and of the actuation elements 28, 30. As in the embodiments of FIGS. 1 to 6, there will be an array of flow modulating elements 8 and the associated actuation elements 28, 30 extending around the wall of the pipe 4. As with the previous examples, either the flow modulating element 8 or the actuation element 28,20 may be made from a shape memory alloy, the other being made from a resilient material, such as spring steel.

It will be appreciated that various other forms of flow modulating element can be employed to achieve a variation in the effective flow cross-section of the pipe 4. In some embodiments, only a single flow modulating element may be employed, which presents a different level of flow resistance according to its temperature.

The actuation elements 10, 28, 30 may act to bias the flow modulating elements 8 away from the wall of the pipe 4. In the embodiment of FIGS. 1 and 2, the actuation elements 10 are situated radially outside the flow modulating elements 8. In alternative embodiments, the actuation elements 10, 28, 30 may bias the flow modulating elements 8 toward the wall of the pipe 4, so as to reduce the resistance to flow. In the higher modulus hot condition, the flow modulating elements 8 then overcome the resistance of the actuation elements 10 to increase the resistance to flow. In such embodiments, for example as shown in FIG. 5 and FIG. 6, the actuation elements 10, 28, 30 may be situated radially within the flow modulating elements 8.

In further embodiments, for example as shown in FIGS. 11, 12 and 13, some flow modulating elements 8 will assume their first and second configurations at different temperature to others. In all other respects the embodiments shown are physically the same as those shown in FIGS. 1 to 10. The flow modulating elements 8 comprise a first flow modulation element 40, a second flow modulation element 42, a first actuation element 44 and a second flow actuation element 46. The first flow modulating element 40 has a fixed end secured to a wall of the duct 4 and a free end which is displaceable relative to the wall of the duct 4. FIGS. 11, 12 and 13 show this arrangement end on, as if looking upstream or downstream at the arrangement. The first actuation element 44 acts on the free end of the first flow modulating element 40. One of the first flow modulation element 40 and first actuation element 44 are made from a material exhibiting a shape memory effect and the other is made from a resilient material to form a resilient element. As in the previous examples, the first flow modulating element 40 and first actuation element 44 assume a first configuration at a first temperature above a transition temperature (as shown in FIG. 12) and assume a second configuration at a second temperature below the transition temperature (as shown in FIG. 11). The modulus of the material exhibiting a shape memory effect will change at the transition temperature such that it overcomes the resilience of the resilient element at the first temperature to assume the first configuration (as shown in FIG. 12). The resilient element will overcome the resilience of the material exhibiting a shape memory effect at the second temperature to cause the first flow modulating element 40 to assume the second configuration (as shown in FIG. 11). The first flow modulating element 40 offers a greater resistance to flow in the duct in one of the configurations than in the other. The second flow modulating element 42 has a fixed end secured to a wall of the duct 4 and a free end which is displaceable relative to the wall of the duct 4. The second actuation element 46 acts on the free end of the second flow modulating element 42. One of the second flow modulation element 42 and second actuation element 46 is made from a material exhibiting a shape memory effect and the other is made from a resilient material to form a resilient element. The second flow modulating element 42 and second actuation element 46 are configured to assume the first configuration (as shown in FIG. 13) and second configuration (as shown in FIG. 11 and FIG. 12) at different temperatures to that of the first flow modulating element 40 and first actuation element 44. In this arrangement, the flow restriction is increased progressively as the temperature rises through the different transition temperatures. Alternatively the flow modulating elements 8 and actuation elements 10 may be configured and arranged such that the flow restriction is decreased progressively as the temperature rises through the different transition temperatures.

In a further embodiment, the flow modulation device comprises three or more sets of flow modulation elements 8 or actuation elements 10, each set having a different transition temperature from the other sets. As in the previous example, the flow restriction could be decreased progressively as the temperature rises through the various transition temperatures.

In an alternative embodiment, the flow modulation device comprises a flow modulating element having a fixed end secured to a wall of the duct and a free end which is displaceable relatively to the wall of the duct and made from a material exhibiting a shape memory effect. The flow modulating element assumes a first configuration at a first temperature above a transition temperature and assumes a second configuration at a second temperature below the transition temperature, the flow modulating element offering a greater resistance to flow in the duct in one of the configurations than in the other. The device further comprises at least one resilient element which acts on the flow modulating element. The modulus of the material of the flow modulating element will change at the transition temperature such that the flow modulating element overcomes the resilience of the resilient element at the first temperature to assume the first configuration. The resilient element will overcome the resilience of the flow modulating element at the second temperature to cause the flow modulating element to assume the second configuration. The resilient element is provided as a spring element which acts between the duct wall and the free end of the flow modulating element, or of a respective one of the flow modulating elements.

Although the invention has been described by reference to embodiments in which the rise in temperature of the flow modulating elements is achieved by way of the flowing fluid to be modulated, other heating means may be employed, such as electrical resistive heating applied directly or indirectly to the flow modulating elements.

The invention claimed is:

1. A flow modulating device for modulating flow in a duct, the device comprising:
    a first flow modulating element having a fixed end secured to a wall of the duct and a free end which is displaceable relative to the wall of the duct; and
    a first actuation element spaced from the first flow modulating element which only acts on the free end of the first flow modulating element, one of the first flow modulation element and first actuation element are made from a material exhibiting a shape memory effect and the other is a resilient element, wherein:
    the first flow modulating element and first actuation element assume a first configuration at a first temperature above a transition temperature and assume a second configuration at a second temperature below the transition temperature,
    the modulus of the material exhibiting a shape memory effect configured to change at the transition temperature such that it overcomes the resilience of the resilient element at the first temperature to assume the first configuration; and
    the resilient element will overcome the resilience of the material exhibiting a shape memory effect at the second temperature to cause the first flow modulating element to assume the second configuration, the first flow modulating element offering a greater resistance to flow in the duct in one of the configurations than in the other.

2. The flow modulating device as claimed in claim 1, wherein the device further comprises:
a second flow modulating element having a fixed end secured to a wall of the duct and a free end which is displaceable relative to the wall of the duct, and
a second actuation element which acts on the free end of the second flow modulating element, one of the second flow modulation element and second actuation element are made from a material exhibiting a shape memory effect and the other is a resilient element, wherein
the second flow modulating element and second actuation element assume the first configuration and second configuration at different temperatures to that of the first flow modulating element and first actuation element.

3. The flow modulating device as claimed in claim 2, in which the first and second flow modulating elements are two of a plurality of first and second flow modulating elements disposed in a circumferential array around the wall of the duct.

4. The flow modulating element as claimed in claim 3, in which the actuation element is one of a plurality of actuation elements disposed in a circumferential array around the wall of the duct.

5. The flow modulating device as claimed in claim 4, in which the actuation elements are elongate and have fixed ends secured to the wall of the duct adjacent fixed ends of respective ones of the flow modulating elements, and free ends which engage the free ends of the respective flow modulating elements.

6. The flow modulating device as claimed in claim 5, in which the fixed ends of the actuation element are disposed radially outwardly of the fixed ends of the flow modulating elements.

7. The flow modulating device as claimed in claim 6, in which the actuation elements have respective fixed ends secured to the duct wall at a position spaced from the flow modulating elements in a direction away from the fixed ends of the flow modulating elements.

8. The flow modulating device as claimed in claim 5, in which the fixed ends of the actuation element are disposed radially inwardly of the fixed ends of the flow modulating elements.

9. The flow modulating device as claimed in claim 3, in which the actuation elements and the flow modulating elements are mounted on a common support ring.

10. The flow modulating device as claimed in claim 3, in which the actuation elements and the flow modulating elements alternate with one another around the duct wall, whereby each actuation element engages two adjacent ones of the flow modulating elements.

11. The flow modulating device as claimed in claim 1, in which the first temperature is higher than the second temperature, and the first configuration of the flow modulating element offers a lower resistance to flow than the second configuration of the flow modulating element.

12. The flow modulating element as claimed in claim 1, in which the flow modulating element lies adjacent to the wall of the duct in the first configuration, and in which the free end of the flow modulating element is deflected inwardly of the wall of the duct in the second configuration.

13. The flow modulating device as claimed in claim 1 wherein the actuation element acts between the duct wall and the free end of the flow modulating element.

14. The flow modulating device as claimed in claim 1, in which the circumferential width of the or each flow modulating element decreases in a direction away from its fixed end.

15. The flow modulating device as claimed in claim 1, wherein:
the first flow modulation element is made from a material exhibiting a shape memory effect and the first actuation element is a resilient element that includes a spring element configured to act between the duct wall and the free end of the flow modulating element, or between a second flow modulating element.

* * * * *